(No Model.) 5 Sheets—Sheet 2.
J. H. ELWARD.
Traction Engine.
No. 236,565. Patented Jan. 11, 1881.
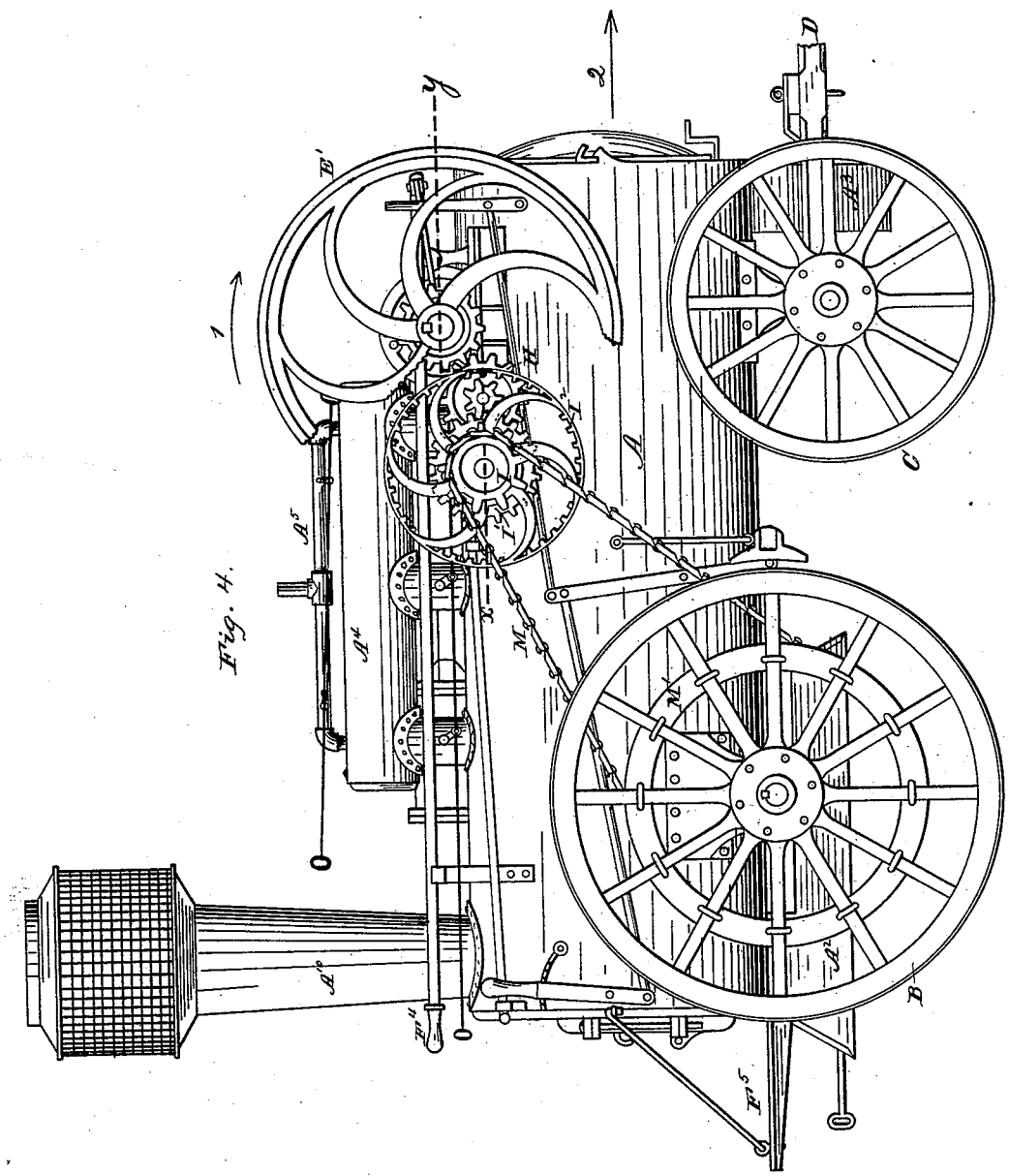

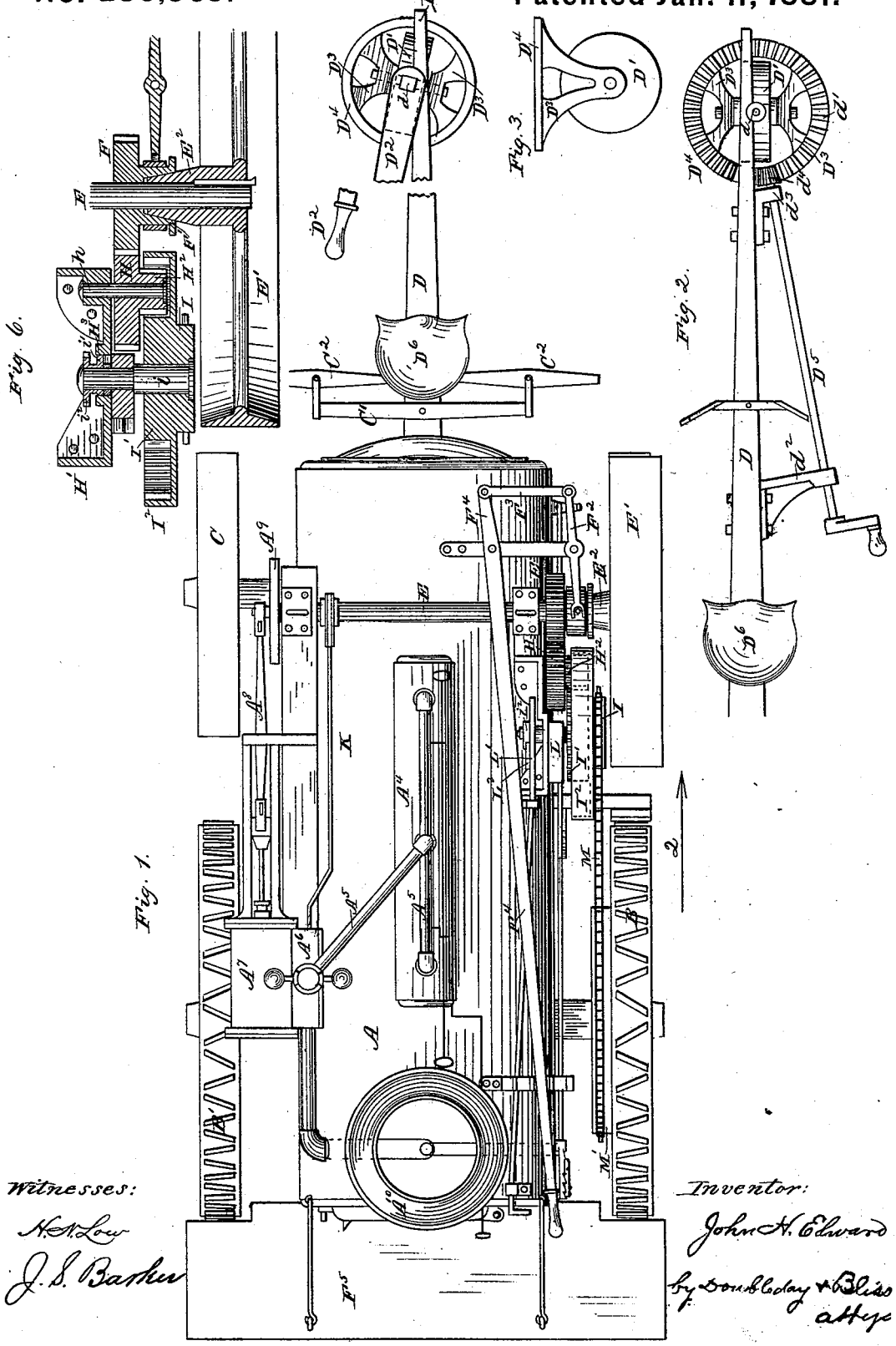

(No Model.) 5 Sheets—Sheet 3.

J. H. ELWARD.
Traction Engine.

No. 236,565. Patented Jan. 11, 1881.

Witnesses:
H. S. Low
J. S. Barker

Inventor:
John H. Elward
by Doubleday & Bliss
attys (No Model.)  J. H. ELWARD.  5 Sheets—Sheet 4.
Traction Engine.
No. 236,565.  Patented Jan. 11, 1881.
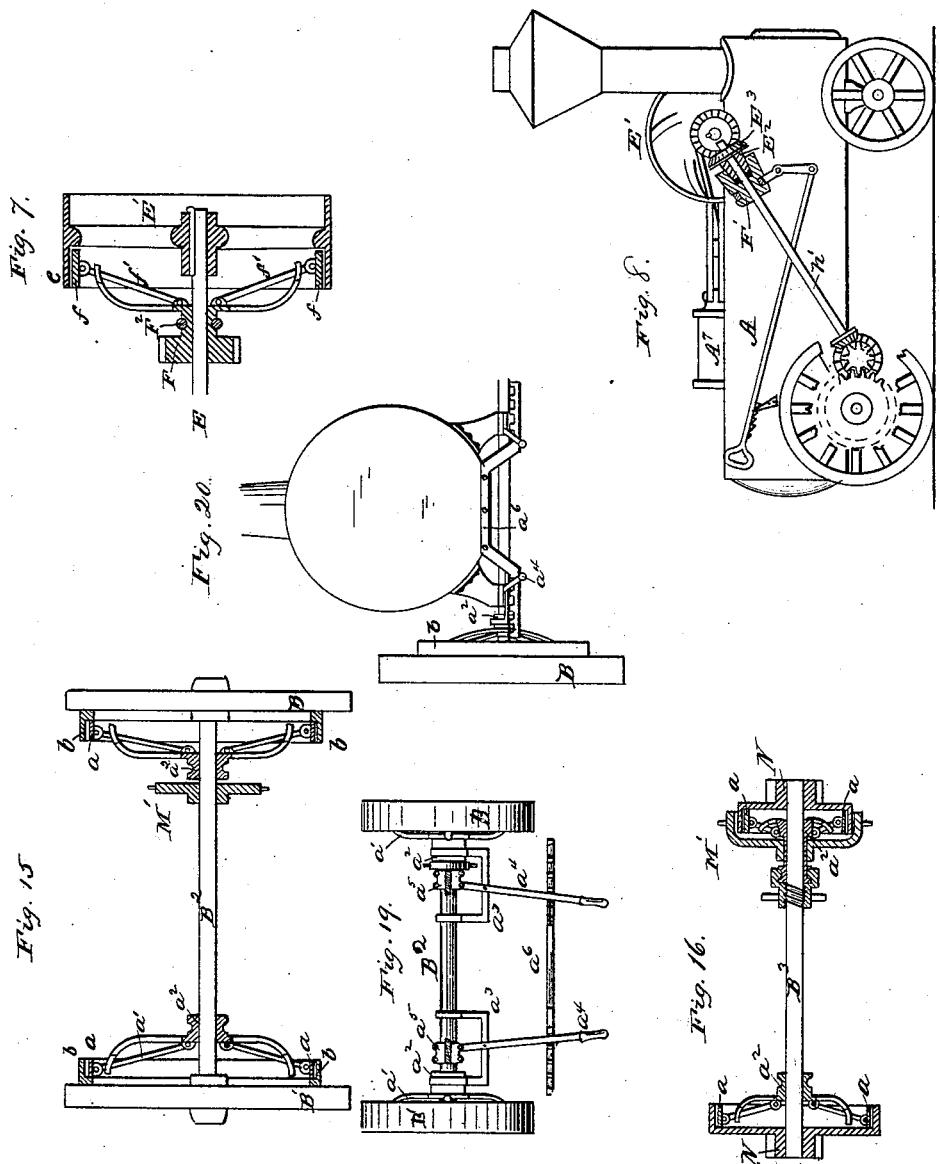

(No Model.) 5 Sheets—Sheet 5.
J. H. ELWARD.
Traction Engine.
No. 236,565. Patented Jan. 11, 1881.
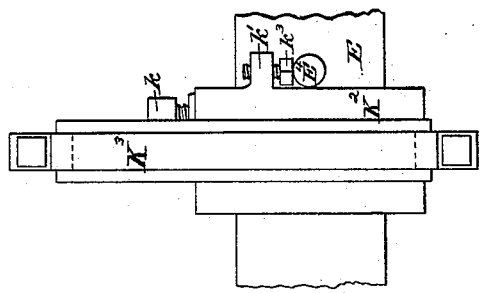
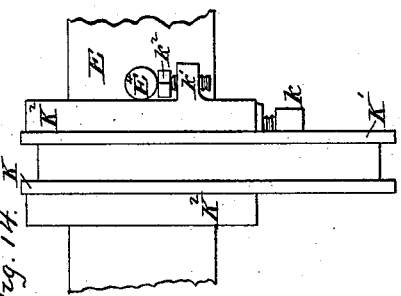
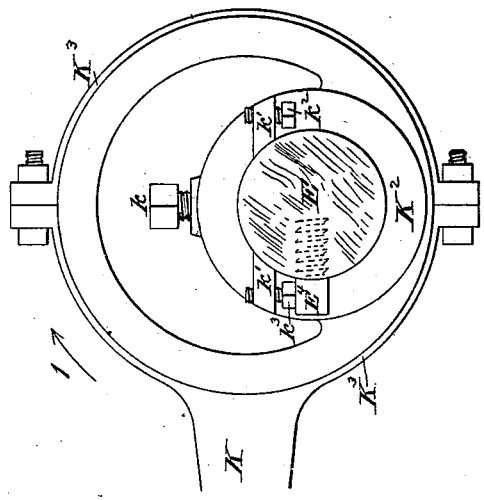
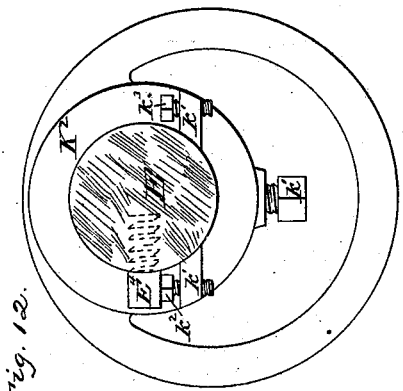
Witnesses:
N. N. Low
J. S. Barker
Inventor:
John H. Elward
by Doubleday & Bliss
attys

UNITED STATES PATENT OFFICE.

JOHN H. ELWARD, OF STILLWATER, MINNESOTA.

TRACTION-ENGINE.

SPECIFICATION forming part of Letters Patent No. 236,565, dated January 11, 1881.

Application filed October 5, 1880. (No model.)

*To all whom it may concern:*

Be it known that I, JOHN H. ELWARD, a citizen of the United States, residing at Stillwater, in the county of Washington and State of Minnesota, have invented certain new and useful Improvements in Traction-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 5:
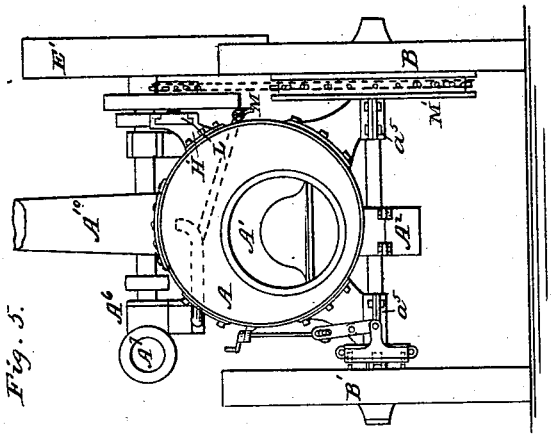
Figure 17:
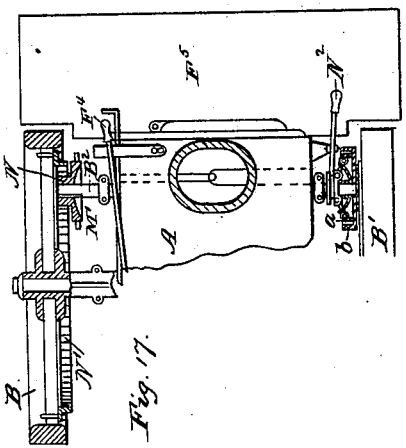
Figure 10:
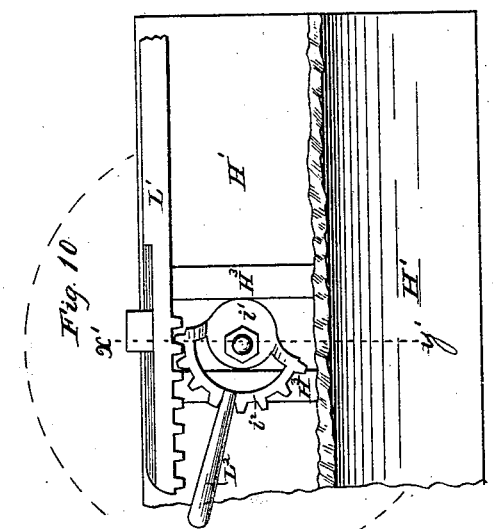
Figure 9:
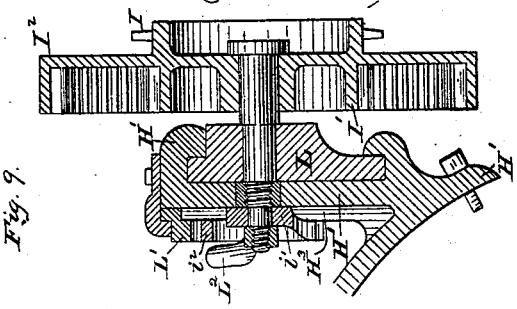
Figure 18:
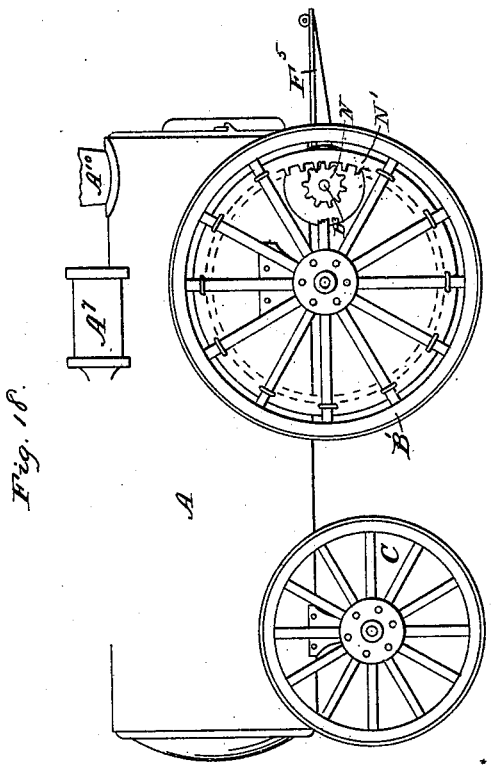

Figure 1 is a top-plan view of my improved traction-engine. Fig. 2 represents a modified form of the steering apparatus shown in Fig. 1. Fig. 3 is a side elevation of the steering caster-wheel detached. Fig. 4 is a side elevation of the traction-engine, the tongue and steering apparatus being removed. Fig. 5 is a rear end elevation of the engine. Fig. 6 is a section of a part taken on the horizontal planes shown by the dotted line $x\,y$, Fig. 4. Figs. 7 and 8 represent modified forms of the friction devices for taking power from the engine-shaft. Fig. 9 is a vertical section of the devices for reversing the motion of the traction-wheels, taken on the line $x'\,y'$, Fig. 10. Fig. 10 is an elevation of the devices shown in Fig. 9, taken from the inner side. Figs. 11 and 12 are side elevations of the eccentric devices for operating the steam-valves. Figs. 13 and 14 are respectively edge views of the parts shown in Figs. 11 and 12. Fig. 15 is a view of the axle of the driving-wheels and a modified form of the devices for imparting power to said wheels. Fig. 16 represents a counter-shaft or supplemental shaft to be employed under some circumstances for imparting power to the driving-wheels. Fig. 17 is a top view, partly in section, of so much of the engine as is necessary to show the method of applying devices similar to those shown in Fig. 16. Fig. 18 is a side elevation, showing the same. Fig. 19 is a plan view of the rear axle and rear carrying-wheels, with a modified form of devices for clutching the wheels to the axle. Fig. 20 is a rear elevation of so much of the engine as is necessary to illustrate the same features of invention.

In the drawings, A represents the boiler; A', the furnace or fire-box; $A^2$, the rear ash-box; $A^3$, the front ash-box; $A^4$, the steam-dome; $A^5\,A^5$, steam-conducting pipes; $A^6$, the steam-chest; $A^7$, the cylinder; $A^8$, the pitman; $A^9$, the crank-wheel, and $A^{10}$ the smoke-stack, all of which parts, together with the details incident thereto, may be of any approved character.

The engine, when being transported or when being used as a traction-engine, is mounted on large rear wheels, B B', and truck-wheels C C. Under some circumstances the rear wheels, B B', are mounted on one and the same shaft, and under others they may be mounted on spindles or independent shafts. The truck-wheels C C are mounted upon a truck-frame, which may be of the ordinary character.

D represents the tongue attached to the truck-frame. When the engine is to be transported by horses they are hitched by whiffle-tree C' and single-trees $C^2$. When the engine is used for traction purposes, or is transported by steam-power, a steering apparatus is secured to and supported by the tongue D.

The steering apparatus consists mainly of a caster-wheel, D', arranged to be freely oscillated around a vertical axis. The vertical axis or shaft $d$ may be attached to the tongue by a suitable boxing, or in any preferred manner. It is turned into any position or direction by the driver by means of a hand-lever, $D^2$, secured to the vertical shaft or axis $d$.

In order to give the steering-wheel a strong support, it is mounted in a bracket-frame, $D^3\,D^4$, having the horizontal plate or ring $D^4$ beneath the tongue D and the brackets $D^3\,D^3$ depending therefrom, as shown in Figs. 1 and 3. If desired, a stationary plate or ring corresponding to the movable one, $D^4$, may be used, the parts forming a device substantially similar to the fifth-wheel of vehicles.

Instead of the oscillating lever $D^2$ shown in Fig. 1, a construction like that shown in Fig. 2 may be employed for turning the caster-wheel. In said figure the plate $D^4$ is shown to be provided with cogs $d'$ on its upper face. $D^5$ is a shaft mounted in suitable bearings $d^2\,d^3$ on the tongue, and carrying a pinion, $d^4$, which engages with the teeth $d'$. By rotating the shaft $D^5$ the caster-wheel can be turned in either direction for steering the engine.

It will be seen that, by mounting the caster-wheel D' at the end of the tongue and then attaching the lever D² to the vertical pivot of the caster-wheel, the power which is required to steer the machine is very greatly reduced, because of the leverage applied by the lever D², multiplied by the leverage which is applied by the tongue D. Therefore a person riding on the seat D⁶ can guide the engine with ease, even when running over rough or soft ground. A further advantage in thus using the tongue for steering is that the operator, sitting on the seat D⁶, is enabled to guide the engine with great accuracy when approaching the thrasher, and thereby insuring that the band-wheel E' shall be located in the same vertical plane as the band-wheel of the thrasher, so that the belt which connects the engine with the thrasher will always run properly; and when desired an upright rod may be attached to the front end of the pole to assist the operator in properly guiding the engine when approaching the thrasher.

It is desirable to provide this class of engines with a tongue and whiffletrees, to which horses may be attached when required.

The application of the steering apparatus to the end of the tongue is a matter of economy, as the parts may be made much lighter than would be required if the caster-wheel D were applied nearer the front of the engine.

The crank-wheel A⁹ rotates the main driving-shaft E of the engine, which, at its opposite ends, carries the band-wheel E', and from these parts the power is communicated to the draft parts or traction parts of the engine.

One of the main purposes of the invention is to provide an improved friction-clutch for connecting the power mechanism to the draft devices after the engine has been put into full motion, and whereby they may be separated without slackening the speed of the engine, so that when there is any unusual resistance to the traction devices it is not necessary to start the engine and the ground-wheels together from rest.

In the friction-clutch which I have devised one element or part thereof is supported and is arranged to be shifted on one of the shafts combined with the clutch, and I have shown several methods of imparting the power in this manner.

In the construction shown in Figs. 1, 4, and 6 the band-wheel E' is provided on its inner side with a conical hub, E².

F is a wheel mounted loosely on shaft E. It has attached to it a sleeve, F', of the form of a hollow frustum of a cone adapted to fit tightly around the conical hub E². The wheel F conveys power to the traction mechanism from shaft E, and shifts along said shaft in order to be engaged with and disengaged from the hub E². When the friction-clutch devices are thus mounted directly on the engine-shaft the engine can be started without resistance from any parts whatsoever beyond the engine-shaft.

I am aware that friction-clutches have been heretofore used on inclined counter-shafts driven by the engine-shaft; but when the clutches are thus used the gearing between the two shafts offers much resistance to the engine when first started.

In the construction shown in Fig. 7 the sliding wheel F carries friction-segments $f$, pivoted by means of links $f'$, and arranged to engage with the flange $e$ on the inside of the band-wheel E'.

A sliding friction-cone may be employed in the manner shown in Fig. 8 with engines employing the ordinary inclined power-shaft. In said figure the shaft E imparts motion to a wheel, E³, carrying a hub, E², and mounted loosely on shaft $h'$. The hollow frustum F' is rotated with and slides on said shaft and engages with the conical hub E².

The devices for shifting the wheel F and the cone F' are shown in Figs. 1 and 4, wherein F² is a forked lever pivoted to a stationary attachment and engaging with the cone-sleeve F'. F³ is a link pivoted to lever F², and F⁴ a hand-lever pivoted to said link and to the engine, and extending to the rear platform, F⁵, whereby the engineer can connect wheel F and the hub E².

The wheel F engages by spur-teeth with a wheel, H, mounted upon a stud-shaft, $h$. This stud-shaft is supported upon a bracket, H', firmly secured to the side of the boiler. The wheel H carries a pinion, H², secured to its outer side, and communicates power through the latter to a chain-wheel, I.

The chain-wheel I is formed with or has attached to its inner side two spur-wheels, I' I², of different diameters, but arranged concentrically with each other and with the chain-wheel. They are so situated that the pinion H² shall be between the spur-teeth of the inner wheel, I', and the outer wheel, I². The chain-wheel, together with the spur-wheels I' and I², can be shifted to and from the pinion H², and it will be readily seen that said chain-wheel will revolve in one direction when the inner wheel, I', engages with pinion H², and in the opposite direction when the outer wheel, I², engages with pinion H². In this way the motion of the driving-wheels can be readily reversed.

If the engine-shaft be moved in the direction of the arrow 1 in Figs. 4 and 11, the engine will be driven forward (in the direction of the arrow 2, Figs. 1 and 4) so long as the inner wheel, I', engages with the pinion H²; but if the wheel be shifted so that the pinion shall engage with the outer wheel, I², the engine will be moved in the opposite direction, and it will be seen that, owing to the longer radius of the wheel I², the engine will be moved backward with much greater power than it can be moved forward, said power being about twice as great as that applied in going forward when the parts are constructed as shown; but it is often desirable, also, in going forward, to move the engine with this increased power—that is to say, move it forward by means of the outer wheel, I² — as, for instance, when going up hill or traversing soft or sandy places, where the power required is greater than on a level road. To accomplish this purpose I have combined with the traction-gear just described devices for changing the position of the eccentric, so that the motion of the engine proper can be readily reversed without altering the traction-gearing, and the whole machine can be carried forward or backward with either of the speeds that are made possible by said traction-gearing.

Referring to Figs. 1, 11, 12, 13, and 14, the eccentric-rod extending from the steam-chest is represented by K. It is connected to the engine-shaft E by means of an eccentric having the flanges K' K' and annular bosses K² K².

E⁴ represents a pin secured on the shaft E, and the eccentric is placed around the shaft in close proximity to said pin. The eccentric is secured in position by means of a set-screw, $k$, passing through and engaging with one of the bosses K².

In order to secure the eccentric to the shaft in a proper position relatively to the steam-ports and the piston, I provide the eccentric with adjustable guiding-stops, which in the drawings are represented as being constructed of lugs or ears $k'$, projecting laterally from one of the bosses K², and with set-screws $k² k²$ passing through and engaging with said lugs.

When the engine is to move in one direction the eccentric is secured to the shaft in such position that the set-screw $k³$ shall be in contact with the pin E⁴, as shown in Figs. 11 and 13, but when the engine is to be moved in the opposite direction the eccentric is turned half-way round. The set-screw $k²$ is then in contact with the pin E⁴, and it is clamped in the position then occupied, as shown in Figs. 12 and 14. In this way positive setting-points for the eccentric are provided. When the eccentric-strap K³ wears, the position of the valves would be affected were there no means for adjusting the position of the eccentric to compensate for such wear. This adjustment is made possible by means of the set-screws $k² k³$.

I will now describe the devices by which I shift the chain-wheel I, the inner wheel, I', and the outer wheel, I³, toward and from wheel H².

Referring to Figs. 1, 6, 9, and 10, a plate, L, is arranged to slide on the outer side of the bracket H' in a "way" of any suitable character. The stud-shaft $i$ of the chain-wheel I is secured to and carried by plate L. It projects backwardly through an opening in the bracket H' and through a cam-disk, $i'$, eccentrically. It is rigidly attached to said cam and carries a segment-gear, $i²$. The cam-disk is situated between two stationary bars, H³, secured to the bracket H', and if said disk be rotated it will be seen that said shaft $i$ will be moved toward and from the shaft $h$, carrying with it the wheels I, I', and I² toward and from wheel H². The cam-disk is rotated by a cogged rack, L', engaging with the segment-gear $i²$, and provided with a handle extending to the engineer's platform, or by means of a short projecting handle, L².

When it is desired to reverse the direction in which the whole machine is moving it can be readily done by these devices without interfering with the action of the engine proper, and this can be done while the engine is running at full speed, to do which the friction-clutch E² F' should be disengaged and the disk $i'$ moved in the required direction, and the friction-clutch brought into engagement again.

Motion is communicated from the sprocket-wheel or chain-wheel I to the drive-wheels B and B' by means of a chain, M, engaging with a sprocket-wheel, M'. In the construction shown in Figs. 1, 4, and 5 the sprocket-wheel M' is attached directly to the driving-wheel B. The sprocket-wheel M' may be attached to the shaft B², as shown in Fig. 15. In this case the driving-wheels are mounted loosely upon the shaft, and are provided with inwardly-extending friction-flanges $b$ $b$, with which flanges friction-clutches are arranged to engage, one at each end of the shaft. The friction-clutches are shown to be formed of friction-segments $a$ $a$, carried by links $a'$ $a'$, pivoted to sleeves $a² a²$, sliding upon feathers on shaft B². The construction which I prefer, however, is shown in Figs. 16, 17, and 18, it having a supplemental or counter shaft, B³, supported suitably beneath the engine in rear of the axle or axles of the driving-wheels, and imparting power to said driving-wheels through pinions N N, adapted to engage with spur-wheels N' N' on the driving-wheels, the pinions being loose on the shaft, but arranged to be rotated therewith by means of friction-clutches, as shown in Figs. 17 and 18, wherein $a$ $a$ are friction-segments attached to sleeves $a² a²$ and arranged to engage with flanges $b$ $b$, formed with the pinions N N. One of the sleeves is keyed to the sprocket-wheel M'. Either may be shifted to and from its corresponding pinion by an ordinary shifting-lever, N², or preferably by a hollow nut, M², engaging with a screw-thread on the shaft, as shown in Fig. 18. By the latter device the friction-clutch can be brought into engagement with the pinion with great power. By this construction and arrangement of parts either one of the traction-wheels may be driven separately, which is useful in turning corners or in backing around short, &c. By engaging both of the traction-wheels with the shaft both may be driven backward or forward, as desired.

Referring to Fig. 19, B² is the axle. B B' are the driving-wheels. $a² a²$ are sleeves sliding freely on the axle, and connected with the friction-segments by the links $a'$, as has been described.

$a³ a³$ are yokes, one end of each yoke engaging with a groove in the sleeve $a²$, and the opposite end of the yoke being formed into a loop which encircles the main axle.

$a^4$ $a^4$ are shipping-levers, pivoted at their inner ends to the lower ends of standards $a^5$, which support the rear end of the boiler upon axle $B^2$; and it will be readily understood that by means of these shipping-levers either or both of the driving-wheels may be connected with the axle by means of the friction-clutches which have been heretofore described.

$a^6$ is a bent notched bar, secured to the rear end of the boiler and depending therefrom, its notched ends being in convenient position to receive and support the outer ends of the shipping-levers $a^4 a^4$. These latter devices may, if desired, be combined with the counter-shaft $B^3$ when used.

Referring to Fig. 1, it will be seen that each of the driving-wheels is provided upon its tread with a series of ribs arranged diagonally to a plane drawn through the axle $B^2$, the two adjacent ribs being inversely inclined relative to the said plane. The object of these ribs is to increase the traction of the engine, and the object of arranging each pair upon converging lines is to prevent any tendency to move the wheel longitudinally upon the axle by the action of these ribs upon the ground over which the engine is being propelled. The ribs are not joined together, but each stands entirely detached from the adjacent ones. This arrangement provides open spaces on each side of the wheel for the escape of the earth which is pressed between the ribs. The ribs clear themselves because the face of each rib bears obliquely against the earth. The earth is therefore pressed laterally through the open space left between the adjacent ends of each pair of ribs. If the ribs are joined together at the ends or placed in immediate contact, closed angles or corners would be formed, wherein the soil would be pressed and retained, there being no aperture for its escape.

I am aware that use has heretofore been made of inclined ribs or flanges having their ends joined together, as above described, and I do not claim such constructions.

I do not herein make any claim to the improvements in boilers or steam-engines which I have shown, as I prefer to make them the subject-matter of another application.

What I claim is—

1. The combination, with the traction-wheel B, the chain M, the chain-operating gears, and the engine-shaft E, of the cone $E^2$, attached to said engine-shaft, the crank-wheel $A^9$, attached to said shaft, the sliding hollow cone $F'$, supported loosely upon said shaft, and the gear-wheel F, attached to said sliding cone, whereby the engine-shaft can be started while entirely disengaged from the gears.

2. The combination, with the boiler, the traction-wheel B, the chain M, and the stationary gears H and $H^2$, of the bracket $H'$, secured directly to the side of the boiler, and the sliding mechanism composed of the chain-wheel I, the inner sliding wheel, $I'$, and the outer sliding wheel, $I^2$, secured rigidly together concentrically, as set forth.

3. In a traction-engine, the combination, with the chain-wheel I, the shaft thereof, and mechanism arranged to rotate said wheel, of a sliding support for said shaft and a rotating support through which the shaft passes eccentrically, substantially as and for the purposes set forth.

4. The combination, with the chain-wheel I and the gearing mechanism which rotates it, of the sliding shaft $i$, the cam-disk $i'$, the segment $i^2$, the rack engaging with the segment, and a sliding support for the shaft $i$, substantially as set forth.

5. The combination, with the engine and the traction-wheels mounted independently of each other, of the counter-shaft $B^3$, mounted beneath the engine parallel to the axis of the driving-wheels, the independently-rotating gear-wheels on said counter-shaft, which engage with the ground-wheels respectively, and the friction-clutches, arranged, substantially as set forth, to connect the counter-shaft with the gear-wheels thereon either independently of each other or simultaneously.

6. In a traction-engine, the combination of the following elements, viz: an engine, ground traction-wheels, mechanism connecting the engine-shaft with the traction-wheels, and adapted to drive said wheels in one direction at a high rate of speed and in the opposite direction at a slow rate of speed, and mechanism adapted to reverse the direction of rotation of the engine-shaft.

7. The combination, with a traction-engine, of a ground-wheel provided with isolated projecting ribs inclined alternately in opposite directions, and arranged to leave open spaces on each side of the wheel between the adjacent ends of the ribs of each consecutive pair, substantially as set forth.

8. In a traction-engine, the combination, substantially as hereinbefore set forth, of the following elements, whereby power may be applied to the traction-wheels independently of each other, viz: a boiler, traction-wheels B $B'$, friction-clutches $a$ $a$, for imparting power to said wheels, sliding yokes $a^3 a^3$, attached to the friction-clutches, levers $a^4$ $a^4$, pivoted to said yokes, and a ratcheted depending bracket, $a^6$, secured to the boiler.

In testimony whereof I affix my signature in presence of two witnesses.

JOHN H. ELWARD.

Witnesses:
EDWARD J. HETFIELD,
GEO. H. GOODHUE.